United States Patent
Quick, Jr.

(10) Patent No.: US 9,979,519 B2
(45) Date of Patent: May 22, 2018

(54) TRANSMITTING AND RECEIVING PRECODING WEIGHTS

(71) Applicant: Trabus Technologies, San Diego, CA (US)

(72) Inventor: Roy Franklin Quick, Jr., San Diego, CA (US)

(73) Assignee: TRABUS TECHNOLOGIES, San Diego, CA (US)

( * ) Notice: Subject to any disclaimer, the term of this patent is extended or adjusted under 35 U.S.C. 154(b) by 97 days.

(21) Appl. No.: 15/167,471

(22) Filed: May 27, 2016

(65) Prior Publication Data

US 2016/0373223 A1    Dec. 22, 2016

Related U.S. Application Data

(60) Provisional application No. 62/182,874, filed on Jun. 22, 2015.

(51) Int. Cl.
| | | |
|---|---|---|
| H04L 5/00 | (2006.01) | |
| H04J 11/00 | (2006.01) | |
| H04H 20/38 | (2008.01) | |
| H04W 72/04 | (2009.01) | |
| H04W 28/02 | (2009.01) | |
| H04B 17/336 | (2015.01) | |
| H04W 74/08 | (2009.01) | |

(52) U.S. Cl.
CPC ......... *H04L 5/0032* (2013.01); *H04B 17/336* (2015.01); *H04H 20/38* (2013.01); *H04J 11/005* (2013.01); *H04W 28/0236* (2013.01); *H04W 72/0406* (2013.01); *H04W 74/0816* (2013.01)

(58) Field of Classification Search
CPC ...... H04L 5/0032; H04J 11/005; H04H 20/38; H04W 72/0406; H04W 28/0236; H04W 74/0816
See application file for complete search history.

(56) References Cited

U.S. PATENT DOCUMENTS

| | | | |
|---|---|---|---|
| 2010/0246549 A1* | 9/2010 | Zhang | H04W 74/0816 370/338 |
| 2011/0188549 A1 | 8/2011 | Wan et al. | |

(Continued)

OTHER PUBLICATIONS

NTT Docomo, "Investigation on Precoding Structure for 3D MIMO", R-153154, 3GPP TSG RAN WG1 Meeting #81, May 16, 2015 in 6 pages.

(Continued)

*Primary Examiner* — Omar J Ghowrwal
(74) *Attorney, Agent, or Firm* — Procopio, Cory, Hargreaves & Savitch LLP

(57) ABSTRACT

A system and method for data communication are presented. The method can include generating a set of precoding weights by autonomously selecting a precoding weight for each antenna at the first transceiver. The method can include transmitting a set of selected precoding weights in a request message. The method can include receiving an indication that the second transceiver unit will accept a transmission from the first transceiver unit. In response to the receiving, the method can include precoding data as precoded data using the set of precoding weights and transmitting the precoded data to the second transceiver unit using antennas of the one or more antennas corresponding to the set of precoding weights.

17 Claims, 6 Drawing Sheets

(56) References Cited

U.S. PATENT DOCUMENTS

| | | |
|---|---|---|
| 2012/0257574 A1 | 10/2012 | Seok et al. |
| 2013/0034187 A1 | 2/2013 | Taoka et al. |
| 2014/0321375 A1* | 10/2014 | Agiwal ............... H04W 56/001 |
| | | 370/329 |
| 2016/0337007 A1* | 11/2016 | Seyedmehdi .......... H04B 7/024 |

OTHER PUBLICATIONS

International Search Report and Written Opinion of International Patent Application No. PCT/US2016/037901 dated Sep. 21, 2016 in 13 pages.

* cited by examiner

TRANSMITTING AND RECEIVING PRECODING WEIGHTS

BACKGROUND

In a communication system, interference can arise when multiple transmitters attempt to transmit data to multiple receivers at the same time over a common channel. For example, in a mobile communication network, several base stations (BSs) can share the same carrier frequency when communicating with different mobile communication devices. This reuse of frequency from one BS to another may create inter-cell interference (ICI) that negatively impacts data rates throughout the mobile communication network.

Many communication systems may address interference by avoiding overlapping transmissions. For example, a mobile communication network can be configured with a lower frequency reuse factor such that fewer cells may share the same carrier frequency. But a communication system's bandwidth may be under-utilized due to overly conservative allocation of the communication system's radio resources.

SUMMARY

Systems and methods for data communication using interference alignment (IA) based on autonomous selection of precoding weights for a plurality of antennas are provided.

An aspect of the disclosure provides a method for data communication at a first transceiver unit having one or more antennas. The method can include generating a set of precoding weights. The set of precoding weights can have a precoding weight for each antenna of the one or more antennas at the first transceiver unit. The method can also include transmitting the set of precoding weights to a second transceiver unit. The method can also include receiving an indication that the second transceiver unit will accept a transmission from the first transceiver unit. In response to the receiving, the method can also include precoding data as precoded data using the set of precoding weights and transmitting the precoded data to the second transceiver unit using antennas of the one or more antennas corresponding to the set of precoding weights.

Another aspect of the disclosure provides a method for data communication at a first transceiver unit. The method can include receiving one or more request messages from at least one of a second transceiver unit and a third transceiver unit. Each of the second transceiver unit and the third transceiver unit can have one or more antennas. The one or more request messages can request to transmit data to the first transceiver unit and can also include a set of precoding weights. The set of precoding weights can have a precoding weight for each antenna of the one or more antennas at the second transceiver unit and the third transceiver unit. The method can also include determining decoding weights based at least in part on the set of precoding weights for all transmitting transceiver units, and channel condition measurements.

Another aspect of the disclosure provides a system for data communications. The system can have a first transceiver unit having one or more antennas. The system can also have a second transceiver unit. The first transceiver unit can generate a first set of precoding weights. The first set of precoding weights can have a precoding weight for each antenna of the one or more antennas, each precoding weight of the first set of precoding weights being selected at the first transceiver unit. The first transceiver unit can also transmit the first set of precoding weights to the second transceiver unit. The first transceiver unit can also receive a message indicating that the second transceiver unit will accept a transmission from the first transceiver unit. In response to receiving the message, the first transceiver unit can also precode data using the selected first set of precoding weights as precoded data. The first transceiver unit can also transmit the precoded data to the second transceiver unit using the one or more antennas corresponding to the first set of precoding weights.

Other features and advantages of the present inventive concept should be apparent from the following description which illustrates by way of example aspects of the present inventive concept.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

Interference alignment (IA) is a linear precoding technique that attempts to align interfering signals in time, frequency, or space. IA can use transmit and receive antenna arrays to allow multiple transmitters to send at the same time on the same resources. IA accomplishes this by canceling the interference from other transmitters while preserving the signal from the intended transmitter. IA can provide higher throughput gains than multiple-in, multiple-out (MIMO) when the channels are of less than full rank. IA also avoids having to allocate resources among the transmit/receive pairs. IA can use the spatial dimensions offered by multiple antennas for interference reduction. In one example, users can coordinate their transmissions, using linear precoding, such that the interference signals lie in a reduced dimensional subspace at each receiver.

Certain embodiments disclosed herein provide for systems and methods for data communication using IA based on the autonomous selection or autonomous determination of precoding weights for various antennas at a transmitter. After reading this description it will become apparent to one skilled in the art how to implement the invention in various alternative embodiments and alternative applications. However, although various embodiments of the present invention are described herein, they are presented by way of example only, and not limitation. Accordingly, this detailed description of various embodiments should not be construed to limit the scope or breadth of the disclosure as set forth in the appended claims.

Figure 1:
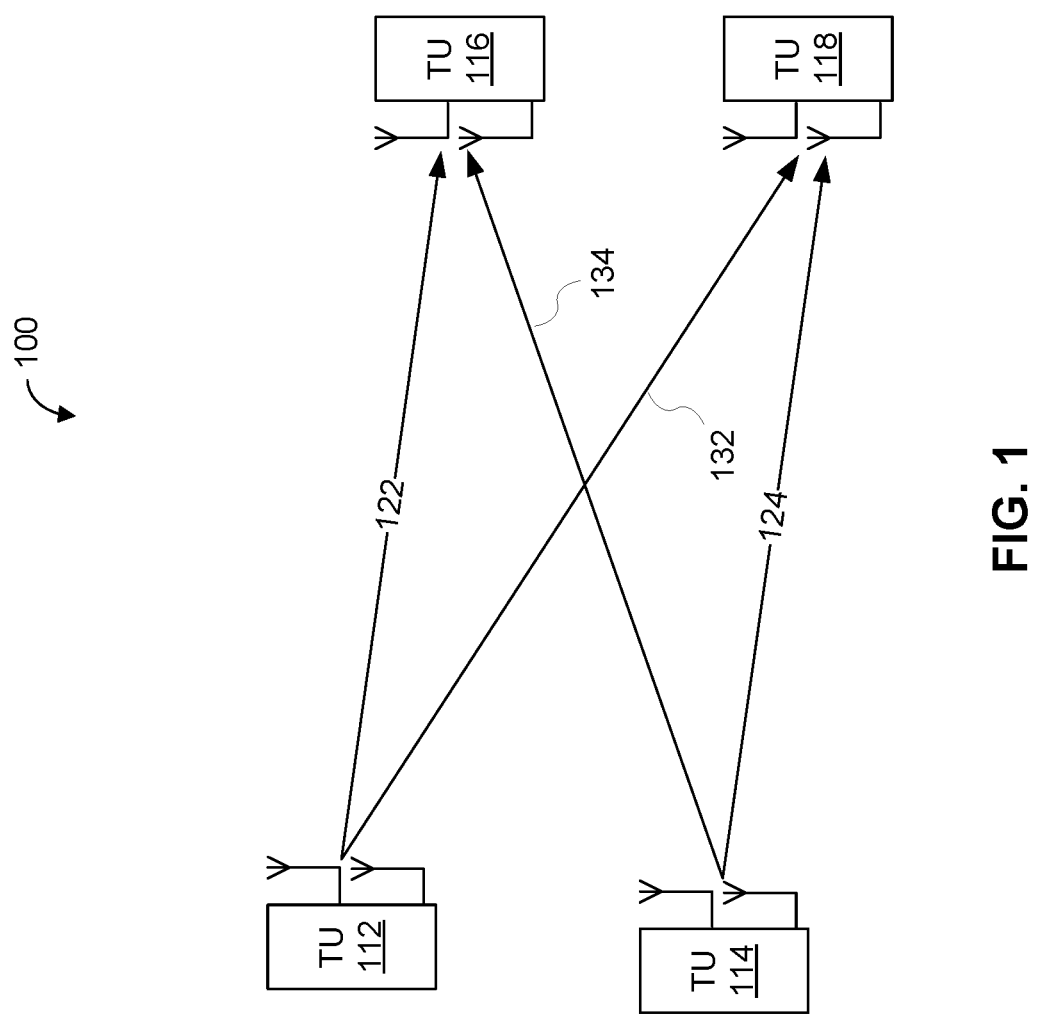
FIG. 1 is a functional block diagram of a network environment.

FIG. 1 is a functional block diagram of a network environment. A network environment 100 can have a plurality of transceiver units (TU) including, for example, a first TU 112, a second TU 114, a third TU 116, and a fourth TU 118. In some embodiments, the TUs can be, for example, mobile units, user equipments, cellular phones, wireless access points, base stations, or other wireless communication devices. The TUs can implement one or more wireless communication protocols and operate according to communication standards such as, for example, IEEE 802.11, Global System for Mobile Communication (GSM), Universal Mobile Telecommunications System (UMTS), Orthogonal frequency-division multiplexing (OFDM), multiple-input and multiple-output (MIMO), Space-Division Multiple Access (SDMA), code division multiple access (CDMA), Long Term Evolution (LTE), Joint Tactical Information Distribution System (JTIDS), and LINK-16/Multifunctional Information Distribution System (MIDS). In various embodiments, one or more of the first TU 112, the second TU 114, the third TU 116, and the fourth TU 118 can be associated with one or more communication networks. Each of the first TU 112, the second TU 114, the third TU 116, and the fourth TU 118 is shown having two antennas, however, in some embodiments, each of the noted TUs can have a different number of antennas without departing from the scope of the disclosure. For example, the first TU 112, the second TU 114, the third TU 116, and the fourth TU 118 can each have one or more antennas. The one or more antennas can be useful in wireless communication protocols requiring multiple antennas, such as, for example, multiple-in multiple-out (MIMO) communications or space-division multiple access (SDMA) communications among various other wireless communication protocols.

The first TU 112 can transmit a first signal 122 to the third TU 116 and the second TU 114 may transmit a second signal 124 to the fourth TU 118. In some embodiments, the first TU 112 and the second TU 114 can share a same carrier frequency. As such, in addition to transmitting the first signal 122 to the third TU 116, the first TU 112 can also transmit a first interference signal 132 to the fourth TU 118. Similarly, in addition to transmitting the second signal 124 to the fourth TU 118, the second TU 114 may also transmit a second interference signal 134 to the third TU 116. The interference signals 132, 134 are such because they arrive at a location other than the intended recipient and, at that recipient, the interference signals 132, 134 are unrelated to the signal from the intended sender. Accordingly, the interfering signal 132 sent by the first TU 112 can result from the transmission of the first signal 122 but because it arrives at the wrong recipient (e.g., the fourth TU 118). Thus to the fourth TU 118, the first signal 122 is the interfering signal 132. In some examples, the interfering signal 132 can be a delayed or altered version of the first signal 122 and is considered "interfering" because the fourth TU is not the intended receiver. The second signal 124 and the interfering signal 134 can have a similar relationship.

In various embodiments, the first interference signal 132 and the second interference signal 134 can be a part of an interference channel (IC). In some examples, an IC can model a situation in which a number (e.g., n-number, where n is an integer) of independent transmitters (e.g., the first TU 112 and the second TU 114) attempt communication of separate information to n-number of different receivers (e.g., the third TU 116 and the fourth TU 118) via a common channel (e.g., the first interference signal 132, and the second interference signal 134). In some examples, there is a one-to-one correlation between transmitters and receivers, as in FIG. 1. Consequently, the transmission of information from each transmitter to its corresponding receiver interferes with the communication between the other transmitters and their receivers.

In some embodiments, the first interference signal 132, and the second interference signal 134 can each be precoded in order to align the first interference signal 132 and the second interference signal 134 received at each of the third TU 116 and the fourth TU 118 into a low dimensional subspace.

In some embodiments, one or more TUs in the network environment 100 (e.g., the first TU 112, the second TU 114, the third TU 116, and the fourth TU 118) can act as one or both of a transmitter or receiver (e.g., a transceiver) without departing from the scope of the disclosure. Moreover, the network environment 100 can have more or fewer TUs than the four shown.

As noted above, the network environment 100 can use one or more various wireless communication protocols. In some embodiments, the network environment 100 can use one or more of wireless communication standards such as, for example, those listed above.

Figure 2:
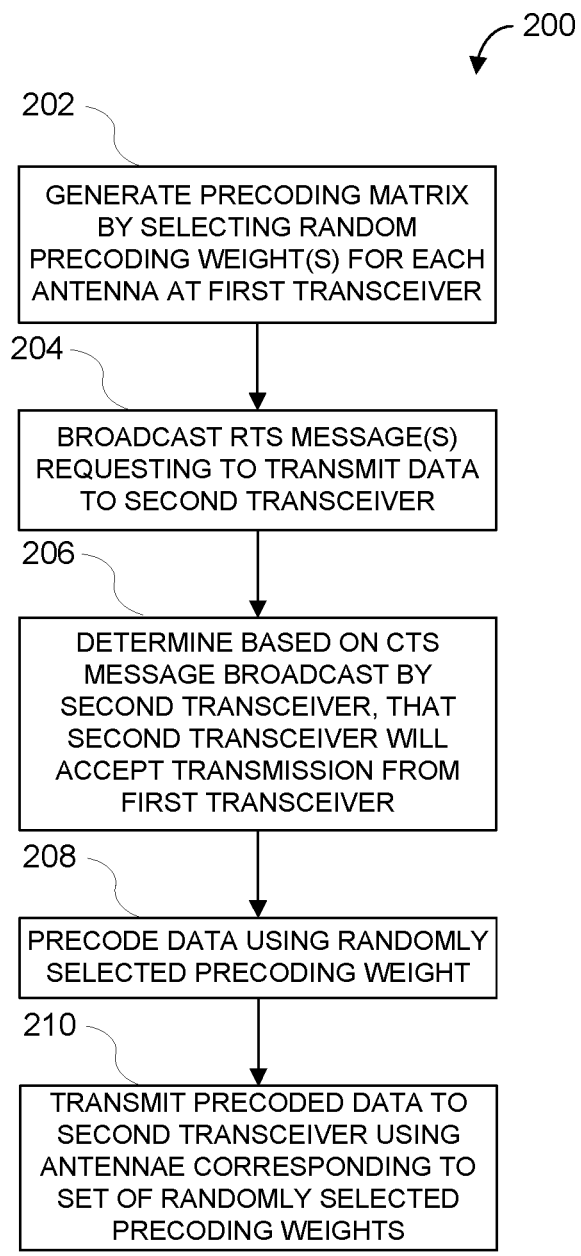
FIG. 2 is a flowchart of an embodiment of a method for data communication.

FIG. 2 is a flowchart of an embodiment of a method for data communication. A method 200 can be performed by one or more transceiver units (e.g., the first TU 112, the second TU 114, third TU 116, and the fourth TU 118) in the network environment 100.

At block 202, a first transceiver unit can generate a set of precoding weights by autonomously selecting a precoding weight for each antenna at the first transceiver unit. As used herein, autonomous selection can refer to the first transceiver determining the precoding weights without the use of information obtained from other transceiver units. The autonomous selection of the precoding weights can be completed using one of a number of different processes. For example, in some embodiments, the selection process can be arbitrary, random, or pseudo-random. In some other embodiments, the selection process for selecting the precoding weights can be non-random or deterministic. In some embodiments, the selection process can be a predetermined process. The predetermined process can be determined at any time before the selection of the precoding weights. For example, the first TU 112 can select or determine a set of precoding weights for a transmission to the third TU 116. In some embodiments, the first TU 112 can select precoding weights without requiring knowledge of channel condition measurements from other TUs in the network environment 100 (e.g., the second TU 114, the third TU 116, and the fourth TU 118).

In some embodiments, the first TU 112 can select precoding weights having a fixed magnitude but random phases. As such, each antenna at the first TU 112 can transmit at full power to provide optimal communication performance.

In some embodiments, the speed or the rate at which the precoding weights change can be adjusted based on variations in channel conditions over time. For example, in the event that channel conditions change frequently, the rate of change of the selected precoding weights may be slow as the variation in channel conditions may be harnessed to randomize communication performance. In contrast, if channel conditions are relatively stable, the rate of change of the selected precoding weights may be fast in order to ensure optimal communication performance.

At block 204, the first transceiver unit can broadcast one or more messages requesting to transmit data to a second transceiver unit. In some embodiments, the one or more messages can be a request to send (RTS) message. For convenience of description, the RTS may be used herein as a primary example, however, it should not be considered limiting. Any suitable transmission can be implemented.

In some embodiments, the RTS message(s) broadcast by the first transceiver unit can include the set of selected precoding weights for the first transceiver unit. For example, the first TU 112 can broadcast RTS messages requesting to transmit data to the third TU 116. The broadcast RTS messages can indicate the set of precoding weights selected by the first TU 112. In some other embodiments, the transmitting transceiver unit (e.g., the first TU 112 or the second TU 114) can transmit a reference signal having the selected precoding weights. In some other embodiments, the set of precoding weights can be sent by the first TU 112 in a reference signal or pilot signal.

In some embodiments, the other (receiving) transceiver units in the network environment 100 (e.g., the second TU 114 and the fourth TU 118) can each be configured to determine whether to accept the transmission from the first TU 112. In some examples, the RTS message (or other request message) can include information identifying the transmitting TU, such as, for example, the identifier (e.g. media access control (MAC) address) of the selected transmitter. Accordingly, the receiving transceiver unit can identify and accept or ignore a request message based on, for example, the identity of the sender. The receiving transceiver units can use other information to determine whether to accept or ignore/reject the request message.

For example, multiple TUs (e.g., the first TU 112 and the second TU 114) can request to transmit data to the third TU 116. The third TU 116 may then receive RTS messages from both the first TU 112 and the second TU 114 having respective indications of the selected precoding weights from each TU. In some embodiments, the third TU 116 can resolve the conflict as to which transmission to accept by applying a selection process. Such a selection process can be random, pseudo-random, or deterministic using, for example, a number obtained from a random number generator, a transmission priority, and a predicted signal to noise ratio (SNR). The predicted SNR can be predicted by the receiver and not contained in the RTS. In some embodiments, more than one method can be used. For example, if two transmissions arriving at the third TU 116 have the same priority, another selection method can be used to break the tie, such as, for example, a random number. If the third TU 116 determines to accept the transmission from the first TU 112 and not from the second TU 114, the third TU 116 can respond with a message indicating that the third TU 116 can accept the transmission from the first TU 112. For example, the third TU 116 can broadcast a clear to send (CTS) message intended for the first TU 112 indicating acceptance of the transmission. In some examples, a CTS message can include the identifier (e.g. media access control (MAC) address) of the selected transmitter. In an embodiment, the selection can be based on the channel quality expected given the precoding weights. In such an example, the third TU 116 can then remain silent with respect to the RTS message received from the second TU 114. For convenience of description, the CTS messages may be used herein as a primary example, however this should not be considered limiting. Any suitable message, datagram, or other communication can provide a similar function, indicating acceptance of the transmission from the first TU 112.

In another example, the third TU 116 can determine to not accept the transmission from the first TU 112 and instead accept the transmission from the second TU 114. Accordingly, the third TU 116 may remain silent and not broadcast a CTS or other type of message accepting the transmission from the first TU 112. Instead the third TU 116 can broadcast a CTS or other suitable message indicating acceptance of the transmission from the second TU 114. In some other embodiments, the third TU 116 may not accept any transmissions. For example, the third TU 116 may have data to send to another TU, and that data is accepted. In another example, the first TU 112 and the third TU 116 may have data to send to each other. The same selection method or algorithm described above can be used to resolve such conflicts.

At block 206, the first transceiver unit can determine, based on a CTS message broadcast by the second transceiver unit, that the second transceiver unit will accept the transmission from the first transceiver unit. For example, the first TU 112 can receive a CTS message broadcast or other acceptance message from the third TU 116. The first TU 112 can determine, based on the CTS message from the third TU 116, that the third TU 116 will accept the transmission from the first TU 112.

At block 208, the first transceiver unit can precode data using the set of selected precoding weights in response to the determining (block 206) that the second transceiver unit will accept the transmission from the first transceiver unit. For example, the first TU 112 can precode the first signal 122 using the set of selected precoding weights indicated in the RTS message (block 204). In some embodiments, the CTS message broadcast by the second transceiver unit (e.g., the third TU 116) can further include one or more channel quality indicators. As such, the first transceiver unit (e.g., the first TU 112), can determine, based on the channel quality indicators included in the CTS message, one or more parameters to apply to the transmission to the second transceiver unit (e.g., the third TU 116). The one or more parameters can include, for example, a modulation order and a code rate based on a predicted SNR.

At block 210, the first transceiver unit can transmit the precoded data to the second transceiver unit using the antennas corresponding to the set of selected precoding weights. For example, the first TU 112 can transmit the precoded first signal 122 to the third TU 116.

Figure 3:
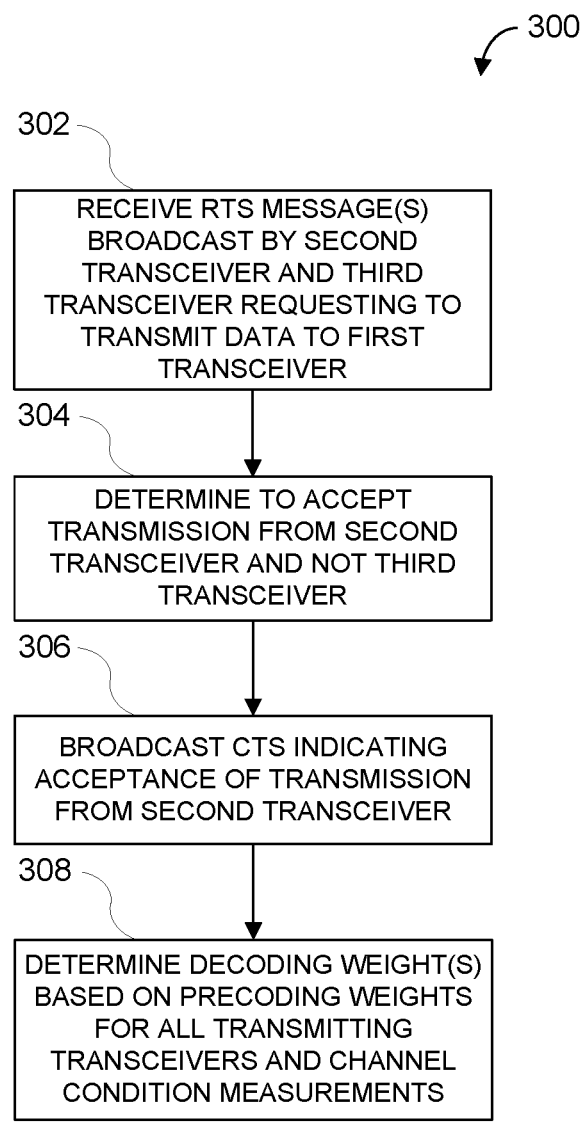
FIG. 3 is a flowchart of another embodiment of a method for data communication.

FIG. 3 is a flowchart of another embodiment of a method for data communication. A method 300 can be performed by one or more transceiver units (e.g., the first TU 112, the second TU 114, the third TU 116, and the fourth TU 118) in the network environment 100.

At block 302, a first transceiver unit can receive one or more RTS messages broadcast by a second transceiver unit and a third transceiver unit requesting to transmit data to the first transceiver unit. For example, both the first TU 112 and the second TU 114 may broadcast RTS messages requesting to transmit data to the third TU 116. In some embodiments, the RTS messages broadcast by the first TU 112 can have the sets of precoding weights selected by the first TU 112, as described in connection with FIG. 2. The RTS messages broadcast by the second TU 114 can have the set of precoding weights selected by the second TU 114. As noted above, the precoding weights can be selected based on one of a number of processes. Precoding weights can be selected based on an arbitrary process, a random process, a pseudo-random process, a non-random process, or deterministic selection process. In some embodiments, the process can be a predetermined process.

At block 304, the first transceiver unit can determine to accept a transmission from the second transceiver unit and not a transmission from the third transceiver unit. For example, when multiple transceiver units (e.g., both the first TU 112 and the second TU 114) attempt to transmit to the third TU 116, the third TU 116 may resolve the conflict as to which transmission to accept by using a random, pseudo-random, or deterministic process or other algorithm as described above in connection with FIG. 2. For example, the third TU 116 can determine to accept the transmission from the first TU 112 and not the transmission from one or more other TUs (e.g., the second TU 114) based on one or more of a random number, a priority, and a predicted SNR. In some examples, the transceiver unit with information ready for transmission can select a random number and include the random number in the RTS or other request message. If there are two or more transceiver units with information to transmit to the same receiver (e.g., one of the TUs), the receiver can choose the one with, for example, the largest random number. If the random numbers turn out to be equal (this is infrequent but mathematically possible), the receiver can select, for example, the lowest identifier. In some embodiments, a MAC address can be used as such an identifier. For example, the receiving TU can select the lowest (or highest) MAC. This process can be modified by allowing an indication of priority levels so that the highest priority transmission can be preferred over lower priorities. The receiver can also determine that the SNR expected for a given transmitter (e.g., one of the TUs) is too low, in which case an alternative transmitter (or no transmitter) can be selected.

At block 306, the first transceiver unit may broadcast a CTS message indicating an acceptance of the transmission from the second transceiver unit, in response to determining to accept the transmission from the second transceiver unit and not the third transceiver unit. For example, the third TU 116 may broadcast a CTS message indicating that the third TU 116 will accept the transmission from the first TU 112 but not the transmission from the second TU 114.

At block 308, the first transceiver unit can determine one or more decoding weights based on the sets of selected precoding weights for all transmitting transceiver units (e.g., the second transceiver unit), and channel condition measurements. The decoding weights can be based on the identity of the transmitting TUs. For example, the third TU 116 can determine one or more decoding weights based on the sets of selected precoding weights for the first TU 112 (and any other transmitting TUs in the network environment 100) but not the second TU 114 (or any other non-transmitting TUs in the network environment 100). The third TU 116 can further consider channel condition measurements when determining the one or more decoding weights. In some examples, the identities of the transmitting TUs can be determined from the received broadcast CTS messages.

In various embodiments, a transceiver unit (e.g., the first TU 112, the second TU 114, the third TU 116, and the fourth TU 118) can select decoding weights reflecting the intended signal (e.g., the first signal 122 or the second signal 124) while minimizing interference from other transmitting transceiver units (e.g., the first interference signal 132, the second interference signal 134). For example, a zero-forcing algorithm or a minimum mean square error (MMSE) method may be applied in order to determine the appropriate decoding weights.

In some embodiments, to apply the zero-forcing algorithm, a transceiver unit can determine decoding weights by solving for decoding weights $\vec{D}_i$ in the following equation (1):

$$\vec{D}_i^T H_{ij} \vec{P}_j = \delta_{ij} = \begin{cases} 1 & i=j \\ 0 & i \neq j \end{cases} \quad (1)$$

In some other embodiments, the MMSE method may be used to minimize the error in the received first signal 122 ($E_{rs}$) at a receiving transceiver unit (e.g., the third TU 116), as defined in equation (2) below, given known values for precoding weights $\vec{P}_j$ and channel condition measurements $H_{ij}$. With known values for $\vec{P}_j$, the derivatives of $E_{rs}$ over the decoding weights $\vec{D}_i$ are linear equations and may be derived with minimal computational complexity. In various embodiments, although MMSE solutions may be biased, the bias may be removed by multiplying $\vec{D}_i$ by a constant that renders $\vec{D}_i^T H_{ij} \vec{P}_j = 1$.

$$E_{rs} = \Sigma_i \Sigma_j |\vec{D}_i^T H_{ij} \vec{P}_j|^2 + 2\sigma^2 \Sigma_i \|\vec{D}_i^T\|^2 - 2Re(\Sigma_i \vec{D}_i^T H_{ii} \vec{P}_i) + K \quad (2)$$

Figure 4:
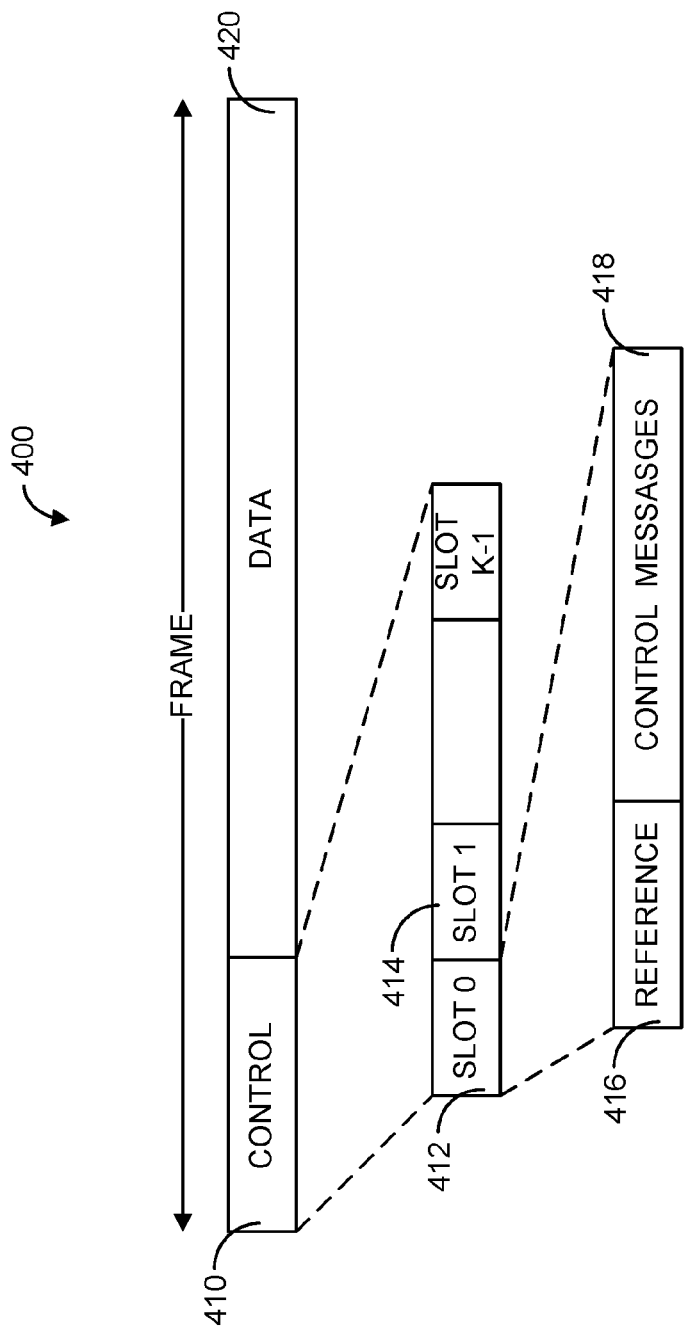
FIG. 4 is a schematic drawing of a data frame.

FIG. 4 is a schematic drawing of a data frame. A frame 400 can be implemented as part of a link level protocol used for transmissions amongst multiple transceiver units in the network environment 100 (FIG. 1). For example, the frame 400 can be implemented as part of the link level protocol used for transmissions amongst the first TU 112, the second TU 114, the third TU 116, and/or the fourth TU 118.

In some embodiments, the transmission between multiple transceiver units can be divided into frames (e.g., the frame 400) within the time domain, each frame having a predefined length. The frame 400 can have a control sub-frame 410 and a data sub-frame 420. The frame control sub-frame 410 can have broadcast information including antenna reference signals plus the RTS/CTS and other control messages. The data sub-frame 420 can have, for example, unicast signals holding user data transferred from transceiver unit to transceiver unit. In some embodiments, the data sub-frame 420 can be divided into multiple time slots such that transmissions between more than one pair of transceiver units may be scheduled during a single instance of the frame 400.

According to one exemplary embodiment, the control sub-frame 410 can be divided into a plurality of TDMA slots including, based on a time division multiple access (TDMA) protocol. For example, the control sub-frame 410 can be subdivided into a first slot 412 and a second slot 414. Each TDMA slot included in the control sub-frame 410 can be assigned to a transceiver unit (or antennas) in the network environment 100. For example, the first TU 112 can be assigned the first slot 412 and the second TU 114 may be assigned the second slot 414. Additional slots can be assigned to other transceiver units in the network environment 100.

In some embodiments, the first slot 412 can have a reference field 416 and a control message field 418. The reference field 416 can have one or more reference symbols for each antenna in a transceiver unit. In some embodiments, RTS and CTS messages broadcast by transceiver units (or different antennas) in the network environment 100 can be conveyed in the control sub-frame 410. The exchange of RTS and CTS messages in the control sub-frame 410 may resolve conflicts in instances where the number of transceiver units requesting to transmit data (e.g., to another transceiver unit) exceeds a maximum number permitted based on network configuration.

For example, when the first TU 112 attempts to transmit data to the third TU 116, the first TU 112 can broadcast an RTS message in the first slot 412 of a first frame (e.g., the frame 400). The third TU 116 can receive multiple RTS messages broadcast by different TUs (e.g., the first TU 112 and the second TU 114), each RTS message indicating a request to transmit data to the third TU 116. The third TU 116 can then determine (e.g., based on a pseudo-random algorithm) to accept the transmission from one of the TUs, from for example the first TU 112. Accordingly, in such an example, the third TU 116 would implicitly not accept the transmission from the second TU 114. As such, the third TU 116 can broadcast a CTS message in the second slot 414 of a subsequent second frame (e.g., the frame 400). Such a CTS can indicate that the first TU 112 is clear to send its traffic. In response to receiving the CTS message broadcast by the third TU 116, the first TU 112 can then transmit data to the third TU 116 in the data sub-frame of the same second frame 400.

In some embodiments, the transmissions amongst the transceiver units in the network environment 100 can be modulated using orthogonal frequency division multiplexing (OFDM) or single-carrier frequency division multiplexing (SC_FDM). As such, channel condition measurements can include a single complex number for each antenna and sub-carrier. Moreover, the transmissions can be synchronous and time based, for example, on an external timing source (e.g., global positioning system (GPS)), or by self-synchronization. In at least one exemplary embodiment, a transmission protocol may be time division duplex (TDD). As such, since both uplink and downlink transmissions share the same channel, each transceiver unit may be aware of other transceiver units in the network environment 100.

In some embodiments, the method 200 and the method 300 in use with the frame 400 can provide improved IA communications within the network environment 100. For example, the only channel information that the first TU 112, the second TU 114, the third TU 116 and the fourth TU 118 need to be obtained is that which is available at the TUs as receivers, derived from reference signals transmitted by the other TU transmitters within the communication environment. Accordingly, in some embodiments, there is no need to exchange channel measurements with other participants (e.g., the TUs) within the network environment 100. In some other embodiments, transmit and receive scheduling can be determined by an exchange of messages between the affected participants (e.g., the TUs) without any centralized control. Additionally, gain calculations can be accomplished at each TU autonomously, without need for negotiation with other network participants.

In some embodiments of the proposed method, each TU in the network environment 100 can select the precoding weights for each transmitter's antennas, changing the precoding weights for each successive transmission. In some embodiments, the selection of the precoding weights can be an arbitrary, random, pseudo-random, non-random, or deterministic selection process. In some other embodiments, the selection process can be predetermined at any time before the selection of the precoding weights. This arrangement can avoid a need for transmitters to obtain channel information from the receivers. The chosen or selected precoding weights are sent to all receivers in the RTS messages according the method 200, the method 300, and the frame 400, as described herein.

Figure 5:
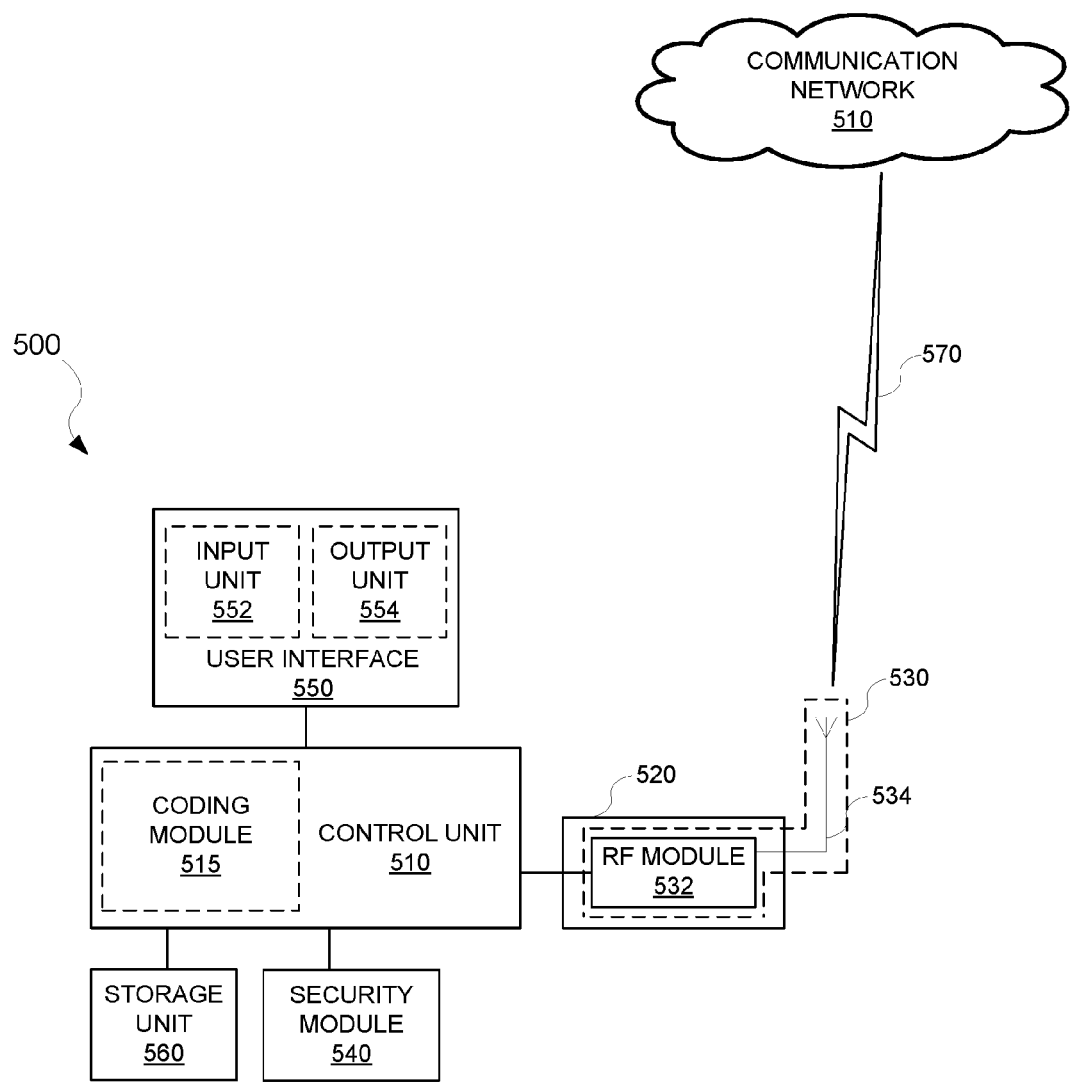
FIG. 5 is a functional block diagram of a transceiver.

FIG. 5 is a functional block diagram of a transceiver unit. A transceiver unit 500 can be implemented as the first TU 112, the second TU 114, the third TU 116, and the fourth TU 118 (FIG. 1). The transceiver unit 500 can have, among other things, a control unit 510. The control unit 510 can have a central processing unit (CPU), having one or more processors or microprocessors configured to control the operations of the transceiver unit 500. The control unit 510 can be coupled to a communication unit 520, a security module 540, a user interface 550, and a storage unit 560.

In some embodiments, the communication unit 520 can have a radio frequency (RF) chain 530. The RF chain 530 can have, for example, an RF module 532 and one or more antennas (antenna) 534. Although the transceiver unit 500 is shown to include a single communication unit (e.g., the communication unit 520), the transceiver unit 500 can have additional communication units without departing from the scope of the disclosure.

In some embodiments, the security module 540 can associate the communication unit 520 with a subscription 570 on a communication network 510. In some embodiments, the security module 540 can be a subscriber identity module (SIM) or other user identification device providing authentication services for a given network. The communication network 510 can support one or more radio access technologies (RATs), including, for example, Wi-Fi (IEEE 802.11b), wideband code division multiple access (WCDMA), Global System for Mobile Communications (GSM), Long Term Evolution (LTE), and time division synchronous code division multiple access (TD-SCDMA), or other wireless protocols as noted above. In some embodiments, the communication network can, for example, support communications between the first TU 112, the second TU 114, the third TU 116, and the fourth TU 118 of the network environment 100 (FIG. 1). Although the transceiver unit 500 is shown with a single security module 540 (e.g., a SIM), the transceiver unit 500 can have additional security module 540 (e.g., multiple SIMs) as required.

In some embodiments, the user interface 550 can have an input unit 552. In some embodiments, the input unit 552 may be, for example, a keyboard or a touch panel for receiving user input. The user interface 550 can have an output unit 554. The output unit 554 can be, for example, a liquid crystal display (LCD) or a light emitting diode (LED) display. In some embodiments, the user interface 550 may be optional. Accordingly, other types or forms of input units 552 and output units 554 can be used without departing from the scope of the disclosure.

In some embodiments, the control unit 510 can control the overall operation of the transceiver unit 500 including controlling the functions of the communication unit 520. The control unit 510 can have a coding module 515 configured to determine precoding and/or decoding weights for uplink transmissions from and/or downlink transmissions to the transceiver unit 500. The control unit 510 can be, for example, a microprocessor (e.g., general-purpose processor, baseband modem processor, etc.) or a microcontroller.

In some embodiments, the storage unit 560 can be one or more memory units operably coupled to the control unit 510 and configured to store application programs, application data, and user data. At least some of the application programs stored at the storage unit 560 can be executed by the control unit 510 for the operation of the transceiver unit 500.

Figure 6:
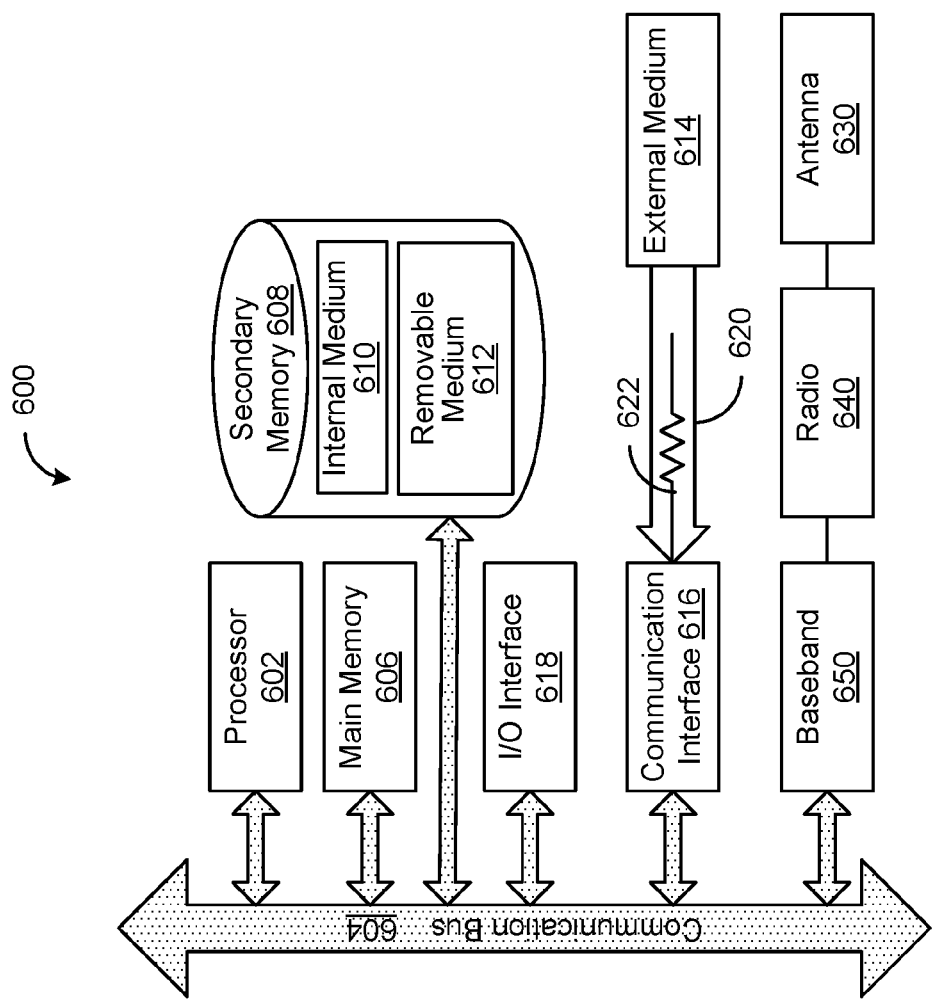
FIG. 6 is a functional block diagram of a communication system.

FIG. 6 is a functional block diagram of an embodiment of a communication system. A communication system (system) 600 can be a wired or wireless communication system coupling two or more transceiver units, such as, for example, the first TU 112, the second TU 114, the third TU 116, and/or the fourth TU 118. In some embodiments, the system 600 can be, for example, a personal computer, computer server, personal digital assistant, smart phone, tablet computer, or any other device or processor enabled device that is capable of wired or wireless data communication. In some embodiments, the system 600 can be a wireless communication device such as, for example, a MIDS/LINK-16 module or a RIFLEMAN radio, among other communication systems.

Other computer systems and/or architectures can also be used without departing from the scope of the disclosure.

The system 600 can have a processor 602. The processor 602 can be implemented as one or more processors or microprocessors. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 602.

The processor 602 can be coupled to a communication bus 604. The communication bus 604 can have a data channel for facilitating information transfer between memory (e.g., the storage unit 560) and other peripheral components of the system 600. The communication bus 604 can also provide signals used for communication with the processor 602, including a data bus, address bus, and control bus (not shown). The communication bus 604 can have any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPM"), IEEE 696/S-100, VITA 49, and the like.

The system 600 can have a main memory 606. The system 600 can also have a secondary memory 608. The main memory 606 can enable storage of instructions and data for programs executing on the processor 602. The main memory 606 can be a semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 608 can have an internal memory 610 and/or a removable medium 612, for example a floppy disk drive, a magnetic tape drive, a compact disc ("CD") drive, a digital versatile disc ("DVD") drive, etc. The removable medium 612 can be, for example, a floppy disk, magnetic tape, CD, DVD, SD card, etc.

The removable storage medium 612 can be a non-transitory computer readable medium having computer executable code (i.e., software) and/or data stored thereon. The computer software or data stored on the removable storage medium 612 can be read into the system 600 for execution by the processor 602. The other storage media, such as, for example, the main memory 606 and the secondary memory 608 can also be embodied on non-transitory computer-readable media.

In some other embodiments, the secondary memory 608 can have other similar means for allowing computer programs or other data or instructions to be loaded into the system 600. Such means can include, for example, an external storage medium 614 and a communication interface 616. The external storage medium 614 can be, for example, an external hard disk drive or an external optical drive, or and external magneto-optical drive.

Other examples of secondary memory 608 can be semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage media 612 and communication interface 616, which allow software and data to be transferred from an external storage medium 614 to the system 600.

The system 600 can also have an input/output ("I/O") interface 618. The I/O interface 618 can facilitate input from and output to external devices. For example the I/O interface 618 can receive input from a user input device (e.g., the UI 550 of FIG. 5) keyboard or mouse and may provide output to a display. The I/O interface 618 can receive input from and deliver output to various alternative types of human interface and machine interface devices.

In some embodiments, the communication interface 616 can allows software and data to be transferred between system 600 and external devices (e.g. printers), networks, or information sources. For example, computer software or executable code can be transferred to system 600 from a network server via the communication interface 616. Examples of communication interface 616 include a modem, a network interface card ("NIC"), a wireless data card, a communications port, a PCMCIA slot and card, a universal serial bus (USB), an infrared interface, and an IEEE 1394 fire-wire, just to name a few.

The communication interface 616 can implement a variety of protocol standards, such as, for example, Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 616 can be in the form of electrical communication signals 622. These signals 622 can be provided to the communication interface 616 via a communication channel 620. In at least one embodiment, the communication channel 620 can be a wired or wireless network, or any variety of other communication links. The communication channel 620 can carry the signals 622 and can be implemented using a variety of wireless communication means including cellular phone link, wireless data communication link, radio frequency ("RF") link, or infrared link, just to name a few.

Computer executable code (i.e., computer programs or software) can be stored in the main memory 606 and/or the secondary memory 608. Computer programs can also be received via communication interface 616 and stored in the main memory 606 and/or the secondary memory 608. Such computer programs, when executed, enable the system 600 to perform the various functions of the present invention as previously described.

In this description, the term "computer readable medium" is used to refer to any non-transitory computer readable storage media used to provide computer executable code (e.g., software and computer programs) to the system 600. Examples of these media include main memory 606, secondary memory 608 (including internal memory 610, removable medium 612, and external storage medium 614), and any peripheral device communicatively coupled with communication interface 616 (including a network information server or other network device). These non-transitory computer readable mediums are means for providing executable code, programming instructions, and software to the system 600.

In an embodiment that is implemented using software, the software may be stored on a computer readable medium and loaded into the system 600 by way of removable medium 612, I/O interface 618, or communication interface 616. In such an embodiment, the software is loaded into the system 600 in the form of electrical communication signals 622. The software, when executed by the processor 602, preferably causes the processor 602 to perform the functions described herein.

The system 600 also includes optional wireless communication components that facilitate wireless communication over a voice and over a data network. The system 600 can also have an antenna system 630, a radio system 640, and a baseband system 650 to enable wireless communications. Each of the antenna system 630, the radio system 640, and the baseband system 650 can be coupled to the other components of the system 600 via the communications bus 604. In the system 600, radio frequency ("RF") signals are transmitted and received over the air by the antenna system 630 under the management of the radio system 640.

In some embodiments, the antenna system 630 can have one or more antennas and one or more multiplexors (not shown) that perform a switching function to provide the antenna system 630 with transmit and receive signal paths. In the receive path, received RF signals can be coupled from a multiplexor to a low noise amplifier (not shown) that amplifies the received RF signal and sends the amplified signal to the radio system 640.

In alternative embodiments, the radio system 640 can have one or more radios that are configured to communicate over various frequencies. In some embodiments, the radio system 640 can combine a demodulator (not shown) and modulator (not shown) in one integrated circuit ("IC") or modem. The demodulator and modulator can also be separate components. In the incoming path, the demodulator strips away the RF carrier signal leaving a baseband receive audio signal, which is sent from the radio system 640 to the baseband system 650.

If the received signal contains audio information, then baseband system 650 decodes the signal and converts it to an analog signal. Then the signal is amplified and sent to a speaker. The baseband system 650 also receives analog audio signals from a microphone. These analog audio signals are converted to digital signals and encoded by the baseband system 650. The baseband system 650 also codes the digital signals for transmission and generates a baseband transmit audio signal that is routed to the modulator portion of the radio system 640. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 630 where the signal is switched to the antenna port for transmission.

The baseband system 650 is also communicatively coupled with the processor 602. The processor 602 can be coupled to the main memory 606 and the secondary memory 608. The processor 602 can execute instructions (i.e., computer programs or software) that can be stored in the main memory 606 or the secondary memory 608. Computer programs can also be received from the baseband system 650 and stored in the main memory 606 or in secondary memory 608, or executed upon receipt. Such computer programs, when executed, enable the system 600 to perform the various functions of the present invention as previously described. For example, the main memory 606 can store various software modules (not shown) that are executable by processor 602.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit, or step is for ease of description. Specific functions or steps can be moved from one module, block, or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

The invention claimed is:

1. A method for data communication at a first transceiver unit having one or more antennas, the method comprising:
generating a set of precoding weights, the set of precoding weights including a precoding weight for each antenna of the one or more antennas at the first transceiver unit;
transmitting the set of precoding weights to a second transceiver unit in a request to send (RTS) message;
receiving an indication that the second transceiver unit will accept a transmission from the first transceiver unit; and
in response to the receiving,
precoding data as precoded data using the set of precoding weights; and
transmitting the precoded data to the second transceiver unit using antennas of the one or more antennas corresponding to the set of precoding weights.

2. The method of claim 1, wherein the indication that the second transceiver unit will accept the transmission from the first transceiver unit is a clear to send (CTS) message.

3. The method of claim 2, wherein the second transceiver broadcasts the CTS message including one or more channel quality indicators.

4. The method of claim 2, further comprising determining, based on the one or more channel quality indicators included in the CTS message, at least one of a modulation order and a code rate to apply to the transmission of the precoded data to the second transceiver unit.

5. The method of claim 1, wherein each precoding weight of the set of precoding weights is selected using one of a random process, a pseudo-random process, a non-random process, and a deterministic process.

6. A method for data communication at a first transceiver unit, comprising:
receiving one or more request messages from at least one of a second transceiver unit and a third transceiver unit, each of the second transceiver unit and the third transceiver unit having one or more antennas, the one or more request messages requesting to transmit data to the first transceiver unit and including a set of precoding weights, the set of precoding weights having a precoding weight for each antenna of the one or more antennas at the second transceiver unit and the third transceiver unit; and
determining decoding weights based at least in part on the set of precoding weights for all transmitting transceiver units, and channel condition measurements.

7. The method of claim 6, wherein the request message is a request to send (RTS) message.

8. The method of claim 6, further comprising:
determining to accept data from the second transceiver unit and not from the third transceiver unit;
transmitting, in response to the determining, a message indicating acceptance of a transmission from the second transceiver unit;
receiving, in response to transmitting, precoded data from the second transceiver unit; and
using the decoding weights to decode the precoded data.

9. The method of claim 8, wherein the message indicating acceptance is a clear to send (CTS) broadcast message.

10. The method of claim 8, wherein the message indicating acceptance includes one or more channel quality indicators.

11. The method of claim 10, wherein the second transceiver unit is configured to determine at least one of a modulation order and a code rate to apply to the transmission from the second transceiver unit based on the one or more channel quality indicators included in the message indicating acceptance.

12. The method of claim 6, wherein the first transceiver unit is further configured to accept data from the second transceiver unit and not the third transceiver unit based on at least one of a random number, a priority, and a predicted signal to noise ratio (SNR).

13. A system for data communications, comprising:
a first transceiver unit having one or more antennas; and
a second transceiver unit,
the first transceiver unit being configured to
generate a first set of precoding weights, the first set of precoding weights including a precoding weight for each antenna of the one or more antennas, each precoding weight of the first set of precoding weights being selected at the first transceiver unit;
transmit the first set of precoding weights to the second transceiver unit in a request to send (RTS) message;
receive a message indicating that the second transceiver unit will accept a transmission from the first transceiver unit; and
in response to receiving the message, the first transceiver unit is further configured to
precode data using the selected first set of precoding weights as precoded data; and
transmit the precoded data to the second transceiver unit using the one or more antennas corresponding to the first set of precoding weights.

14. The system of claim 13, further comprising a third transceiver unit, wherein the second transceiver unit is configured to:
receive the first set of precoding weights from the first transceiver unit and a second set of precoding weights from the third transceiver unit, the second set of precoding weights being selected at the third transceiver unit;
accept data communications from the first transceiver unit and not from the third transceiver unit;
determine a first set of decoding weights based at least in part on the first set of precoding weights, and channel condition measurements;
broadcast the message indicating that the second transceiver unit will accept the transmission from the first transceiver unit;
receive, in response to the message, precoded data from the first transceiver unit; and
decode the precoded data based on the first set of decoding weights.

15. The system of claim 14, wherein each precoding weight of the set of precoding weights is selected using one of a random process, a pseudo-random process, a non-random process, and a deterministic process.

16. The system of claim 14, wherein the message indicating acceptance by the second transceiver unit is a clear to send (CTS) broadcast message having one or more channel quality indicators.

17. The system of claim 16, wherein the first transceiver unit is configured to determine at least one of a modulation order and a code rate to apply to the transmission from the second transceiver unit based on the one or more channel quality indicators included in the CTS message.

\* \* \* \* \*